United States Patent [19]
Bormann et al.

[11] Patent Number: 6,030,022
[45] Date of Patent: Feb. 29, 2000

[54] METHOD OF PRODUCING A PROFILED SEAL FOR A CABRIOLET HOOD, AND PROFILED SEAL

[75] Inventors: Josef Bormann, Harsum; Jens Anders, Marienhagen; Alistair Hill, Hildesheim, all of Germany

[73] Assignee: Meteor Gummiwerke K. H. Bädje GmbH & Co., Bockenem, Germany

[21] Appl. No.: 08/981,439

[22] PCT Filed: Nov. 5, 1995

[86] PCT No.: PCT/EP95/04338

§ 371 Date: Dec. 19, 1997

§ 102(e) Date: Dec. 19, 1997

[87] PCT Pub. No.: WO97/00180

PCT Pub. Date: Jan. 3, 1997

[30] Foreign Application Priority Data

Jun. 19, 1995 [DE] Germany .............................. 19522085

[51] Int. Cl.[7] ........................................................ B60J 7/00
[52] U.S. Cl. .................. 296/107.04; 296/107.01; 296/135; 296/107.05; 49/483.1; 49/495.1
[58] Field of Search .................. 296/107.01, 135, 296/107.04, 107.05; 49/483.1, 495.1, 496.1

[56] References Cited

U.S. PATENT DOCUMENTS

| | | | |
|---|---|---|---|
| 2,813,748 | 11/1957 | Panik | 49/495.1 |
| 2,817,558 | 12/1957 | Kubacka et al. | 49/495.1 |
| 3,164,870 | 1/1965 | Harms et al. | 49/495.1 |
| 5,010,689 | 4/1991 | Vaughan | 49/495.1 |
| 5,669,656 | 9/1997 | Aydt et al. | 296/135 |

FOREIGN PATENT DOCUMENTS 2254354  10/1992  United Kingdom ................. 49/483.1

*Primary Examiner*—Joseph D. Pape
*Assistant Examiner*—Kiran Patel
*Attorney, Agent, or Firm*—Synnestvedt & Lechner LLP

[57] ABSTRACT

The sealing profile (5) comprises an inherently stable carrier rail (7) which is injection-coated over a part of its periphery with an elastomeric profile strip (8). On a peripheral portion (10) without elastomer lie heads (9) of fixing members (6) which are screwed into roof guides (4) of the folding soft top (2). Sealing lips (17, 18) take care of the sealing in relation to a side window (21). A further sealing lip (22) effects sealing in relation to the roof cover (24).

19 Claims, 9 Drawing Sheets

METHOD OF PRODUCING A PROFILED SEAL FOR A CABRIOLET HOOD, AND PROFILED SEAL

BACKGROUND

The invention relates to a sealing profile for a folding soft top of a convertible and to a method of manufacture for the same.

In one known method of this type (EP 0 654 372 A1) the carrier rail consists of sheet metal. An elastomeric profile strip is formed on the carrier rail. To the extent that a three-dimensional shaping of the finished sealing profile is necessary, this is evidently produced by sweep-bending. In a base of the sealing profile are provided holes which have play on all sides in relation to the threaded bolts of a fixing member. Each fixing member engages in a threaded bore of a mounting part of the folding soft top and supports itself on the base by means of a washer.

From EP 0 412 782 A2 it is known per se to manufacture the carrier rail from sheet metal, to extend this into the metal core of a clamping profile and then to cover it over with an elastomeric profile strip. Here again, a three-dimensional shaping of the finished sealing profile, including its clamping profile, is carried out by sweep-bending.

From EP 0 587 428 A1 it is known per se to coextrude the sealing profile from a comparatively stiff mounting profile, for example of a polyurethane having a Shore A hardness of 85 to 100, and a softer sealing strip, for example of a polyurethane having a Shore A hardness of 60 to 80.

From DE 43 20 330 A1 it is known per se to produce the carrier rail from metal or plastics material and to form an elastomeric profile strip thereon. Since the upper edge of the side window runs linearly, a three-dimensional shaping of the finished sealing profile is not necessary here.

In another method which is known per se, the carrier rail is extruded, preferably from aluminum, is severed and is sweep-bent in a costly manner into the desired, three-dimensional shape. The elastomeric profile strip is extruded separately from the carrier rail, is severed and is releasably anchored by hand to receiving profiles of the carrier rail, after the carrier rail has been fitted by fastening members to mounting parts of the folding soft top. The cross-sectional shape and fitting of the carrier rail and of the elastomeric profile strip are complex and cost-intensive. If the sealing profile does not seat optimally on the mounting parts, a relative adjustment must be carried out. For this, the elastomeric profile strip has to be released from the carrier rail and after the adjustment work has to be anchored again to the carrier rail. This procedure, particularly if it has to be repeated several times, is time-consuming and costly.

SUMMARY OF THE INVENTION

It is the object of the invention to simplify the production of the sealing profile as well as the sealing profile itself and its fitting, and to achieve this at less cost.

This object is achieved in accordance with the invention by a method for the manufacture of a sealing profile for a folding soft top of a convertible wherein the sealing profile includes an inherently stable carrier rail and at least one elastomeric profile strip. The method includes the steps of (a) injection molding the carrier rail from plastics material in a first molding tool wherein the rail is formed into a substantially final three-dimensional shape, and (b) injecting onto and vulcanizing at least one elastomeric profile strip to the carrier rail in a second molding tool. This type of production makes sweep-bending unnecessary but nevertheless leads to very accurate shaping of the sealing profile.

The above-mentioned object is also achieved in accordance with the invention, in relation to the method for the manufacture of a sealing profile for a folding soft top which includes providing an inherently stable carrier rail and connecting at least one elastomeric profile strip to the carrier rail. The sealing profile is formed to be three-dimensional and securable by threaded bolts to a mounting part of the folding soft top. At least two of the threaded bolts, which are spaced from one another, are fixable to the carrier rail of the sealing profile so that during the fitting of the sealing profile each threaded bolt is adapted to be pushed through a hole of the associated mounting part and to be fixed axially relative to the mounting part. By this means one achieves a particularly simple fitting for the sealing profile. The sealing profile, together with its threaded bolts, constitutes a rigid component. On the threaded bolts, before the fitting and also during the fitting, compensating plates can be put in place in a particularly simple manner which enable an adjustment of the sealing profile along the longitudinal axes of the threaded bolts. The pushing of the threaded bolts into place through the holes in the mounting parts is simple and can be accomplished quickly. The threaded bolts have radial play in relation to the holes in the mounting parts, preferably on all sides, so that a radial adjustment of the section relative to the threaded bolts can be effected. The fixing of the threaded bolts relative to the mounting part is particularly effective if on the free end of the threaded bolts is first fitted a plate and then a nut is screwed into place. The screwing on procedure is effected only from the outside of the sealing profile. This facilitates the fitting on the one hand and on the other hand the accurate adjustment of the sealing profile on the mounting part.

The above-mentioned object is achieved, in relation to the sealing profile, by the features of a three dimensional sealing profile fastenable by means of fixing members to mounting parts of a folding soft top of a convertible. The sealing profile includes an inherently stable carrier rail having a first leg and a second leg, the first leg cooperates with the fixing members to fasten the sealing profile to the mounting parts. At least one elastomeric profile strip is connected to the carrier rail, the elastomeric strip being injection-molded onto at least a part of a periphery of the carrier rail and has an outer part injected onto the second leg. The outer part has a one side capable of being fixed relative to the folding soft top to cooperate sealingly therewith and an opposing side opposite the first side for contacting a contact surface of the convertible to cooperate sealingly therewith when the folding soft top is closed. The integrated carrier rail is inexpensive and can be made accurately to shape, as well as being simple to handle, to fit and if necessary to adjust relative to the folding soft top. The features of claim 3 lead to a trouble-free sealing of the folding soft top on the one hand at the front relative to a windshield profile of the convertible and on the other hand at the rear against a so-called tension hoop of the folding soft top relative to a roof cover housing of the convertible.

The outer part of the sealing profile can include a first elastomeric profile strip of soft rubber injected onto the second leg. The sealing profile can further include at least one second elastomeric profile strip of foam rubber injected onto the first elastomeric profile strip and positioned to be capable of cooperating sealingly with the opposing contact surface. The at least one second elastomeric profile strip is preferably formed to be tubular and leads to a particularly good seal against the opposing contact surface.

A carrier rail of sheet metal is inexpensive and can easily be formed with sufficient rigidity. If the carrier rail is extruded from a thermoplastics material, the prefabricated carrier rail can be coextruded cost effectively with at least one elastomeric profile strip. An injection molded carrier rail of plastics material is characterised by high dimensional accuracy.

In another embodiment, the three dimensional sealing profile includes an inherently stable carrier rail and at least one elastomeric profile strip connected to the carrier rail. The elastomer profile strip is injection molded onto at least a part of a periphery of the carrier rail. Also included are fixing members for fastening the sealing profile to the mounting part of the folding soft top. The fixing members include at least two spaced threaded bolts fixed to the carrier rail so as to be held thereby. Each of the threaded bolts are arranged to be pushed through a corresponding hole in the mounting part and axially securable relative to the mounting part. At least one of the bolts may have a free end and a frusto-conical head broadening towards the free end, the carrier rail having a hole shaped complementary to the frusto-conical head in which the frusto-conical head is arranged. Even with really thin carrier rails, for example of VA metal sheet of 0.6 mm thickness, the head can lie substantially flush with an internal face of the carrier rail. The fitting of the threaded bolts can be carried out by each threaded bolt being pushed into its hole in the carrier rail and then securing it in the hole by the application of axial force to the threaded bolt.

Where the frusto-conical head includes a sleeve which has profilings that engage in a shape-locking manner an opposing contact surface of the complementarily shaped hole, the threaded bolts can be held in the carrier rail with particular security against rotation.

The carrier rail can include corresponding holes for each of the threaded bolts. Each of the holes has an annular surface which surrounds the hole on an internal face of the carrier rail. Furthermore, each of the threaded bolts extends through one of the corresponding holes in the carrier rail and has a head in contact with the annular surface of the corresponding hole. This provides a particularly well defined axial end position for the threaded bolts.

Particularly good security against rotation of the threaded bolts in their holes in the carrier rail is provided where each of the threaded bolts includes a stem having profilings immediately adjoining the head of the bolt, and each of said corresponding holes has a wall engaged in a shape-locking manner by the profilings. Similarly, each head can have profilings which engage the internal face of the carrier rail in a shape-locking manner.

The threaded bolts may be seated in the holes of the carrier rail by being press fitted therein to increase the fixed seating of the threaded bolts in the carrier rail, especially if this is made from sheet metal.

The head of each threaded bolt can be adhesively secured to the internal face of the carrier rail. Here, the carrier rail can be made from sheet metal or plastics material. In both cases one achieves a reliable connection of the threaded bolts to the carrier rail.

The threaded bolts can be made of plastics material such as polyamide. Another material is metal such as corrosion-resistant or stainless steel or aluminum, and which can be welded to the metallic carrier rail.

The sealing profile can also be formed as a completely closed tube, since one does not need to push the threaded bolts any longer from the interior of the sealing profile into the holes in the carrier rail.

The threaded bolts are preferably connected to the carrier rail by butt welding.

These and further features and advantages of the invention will become more apparent from the following description of a number of embodiments which are given by way of example and which are shown in the drawings.

DETAILED DESCRIPTION

Figure 1:
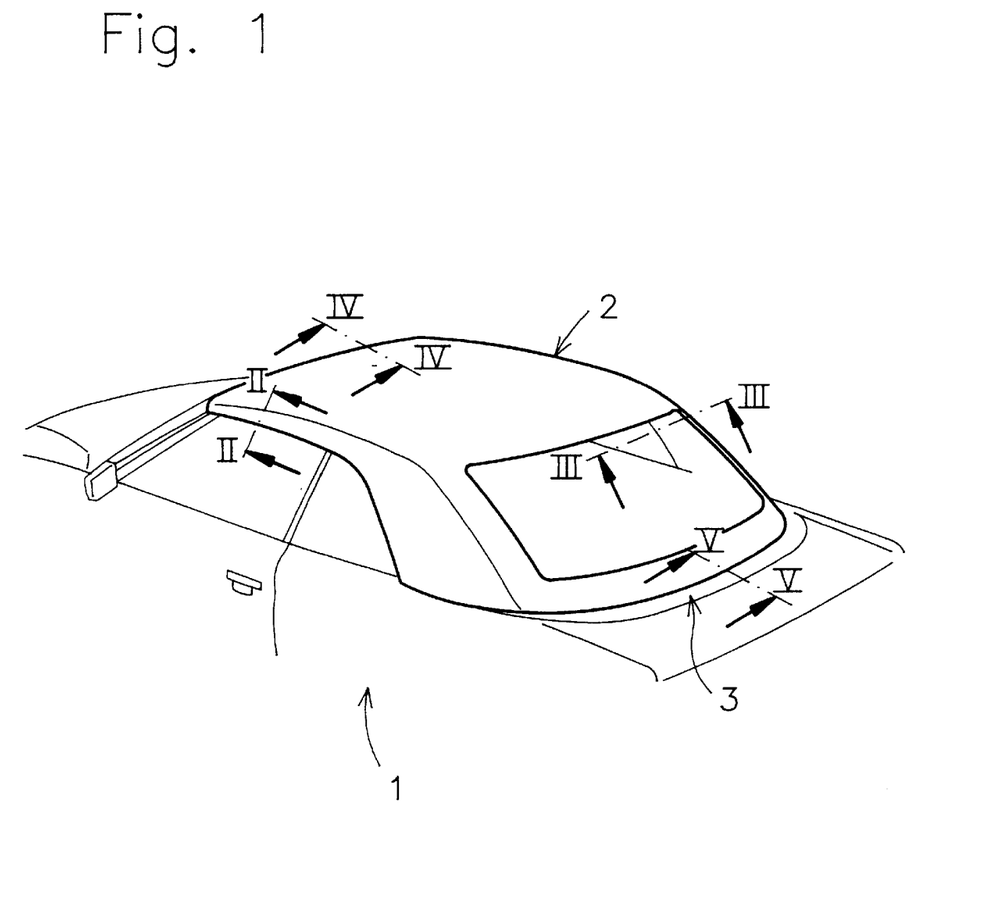
FIG. 1 is a perspective, schematic view of the upper part of a convertible.

FIG. 1 shows a convertible 1 with a closed folding soft top 2 which in a manner known per se can be lowered into a soft top housing 3.

Figure 2:
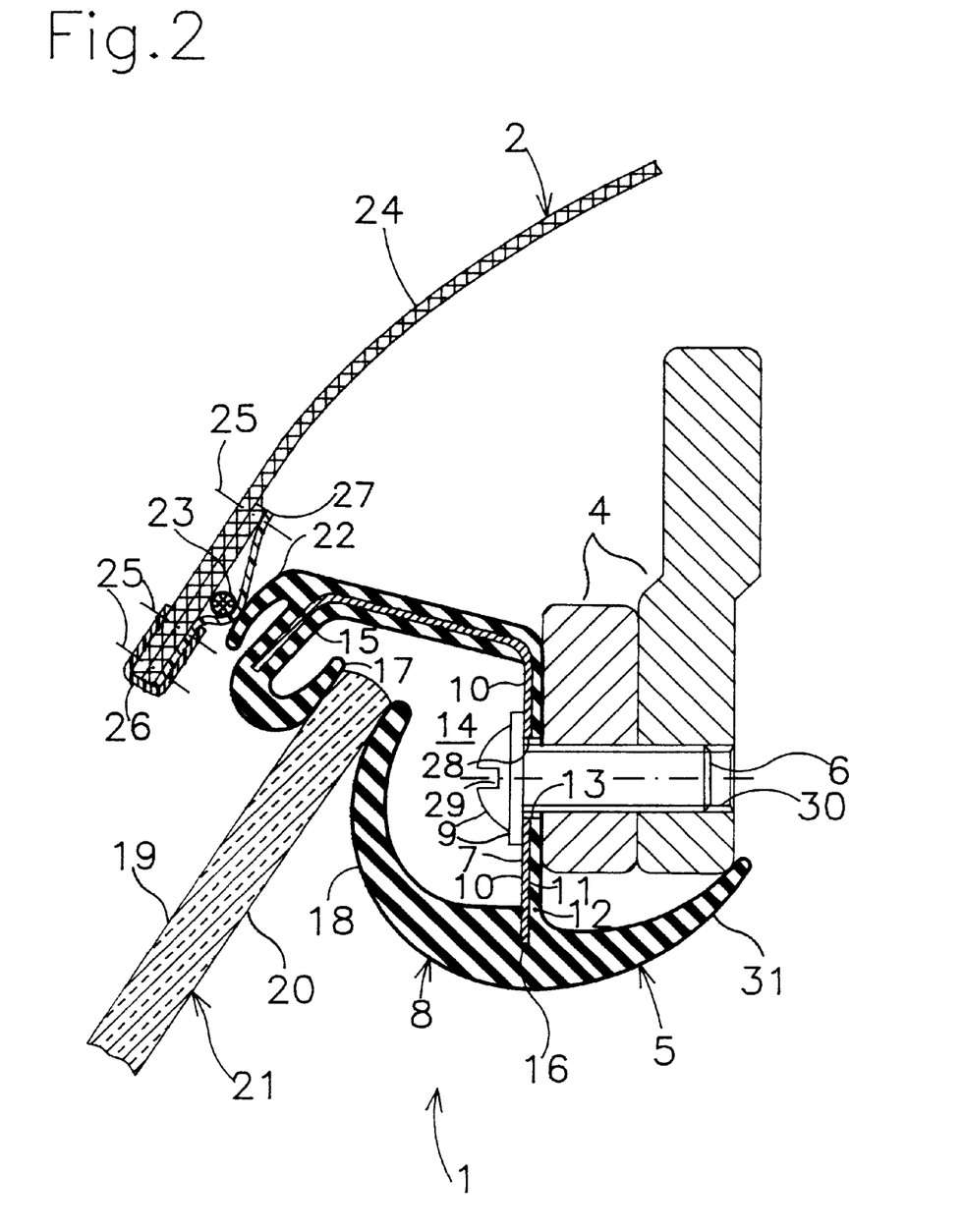
FIG. 2 is the sectional view taken along the line II—II in FIG. 1 on an enlarged scale.

As shown in FIG. 2, a sealing profile 5 is fixed to a roof guide 4 (also referred to herein as mounting members or mounting parts) of the folding soft top 2 by fixing members 6 which here are formed as carriage screws. The sealing profile 5 comprises an inherently stable carrier rail 7 which consists for example of 0.4 to 0.6 mm thick stainless VA metal sheet. Such metal sheet can be deformed comparatively simply into the cross-sectional shape shown in FIG. 2 on a roll-bending machine.

The carrier rail 7 is injection-coated over the greater part of its contour with an elastomeric profile strip 8. The carrier rail 7 is left free from elastomer only in a peripheral region 10 which lies opposite heads 9 of the fixing members 6. In comparison, a peripheral region 11 of the carrier rail 7 on the other side from the heads 9 of the fixing members 6 is provided with an elastomeric layer 12 which has a hole 13 therethrough in the region of each fixing member 6.

Into a concave side 14 of the sealing profile 5 there project sealing lips 17 and 18 of the elastomeric profile strip 8, respectively from a leg 15 and a leg 16 of the carrier rail 7. The elastomeric profile strip 8 can be made for example of soft rubber with a hardness of 50 to 70 Shore A.

Each sealing lip 17, 18 cooperates with a respective side face 19 and 20 of a side window 21 of the convertible 1 (FIG. 1). The sealing lips 17, 18 can be covered with flocking for example to reduce the sliding friction forces in the region of engagement with the side window 21 or can be coated with non-friction varnish.

On the side of the profile remote from the sealing lip 17 a further sealing lip 22 is formed on the sealing profile 5 outside the leg 15, and against which, with the folding soft top 2 closed, a lower edge of the folding soft top is sealingly pressed in a manner known per se by means of a straining wire 23. A roof cover 24 is turned up inwards at the lower edge and by means of seams 25 is sewn on the one hand to itself and on the other hand to an edge protector 26 and to a retainer 27 for the straining wire 23.

In order to manufacture the sealing profile 5, one proceeds as follows:

Starting from a flat sheet metal strip, the carrier rail 7 is formed, preferably by means of a roll-bending machine, into its substantially final cross-sectional shape as shown in FIG. 2. Subsequently, the carrier rail 7 is fed into a multi-component injection head (not shown) of an extruder, in which the carrier rail 7 is injection-coated over the greater part of its periphery, with the exception of the peripheral region 10, with the elastomeric profile strip 8. The sealing profile 5 is cross-linked, cooled and cut into sections after leaving the multi-component injection head. Each section is sweep-bent in order to produce its three-dimensional shape. After this, in the customary way, the axial ends of the sealing profile 5 are cut off and the ends of the sealing profile 5 are made ready for use by the fitting of end caps or the like.

In this preformed and prefabricated state the sealing profile 5 is supplied to the assembly line on which the convertible 1 is manufactured. The fitter then introduces the fixing members 6 between the sealing lips 17, 18 through into the concave side 14 of the sealing profile 5, and guides them firstly through holes 28 in the carrier rail 7 and then through the holes 13 in the elastomeric layer 12 which are in alignment therewith. Then, a screwdriver is introduced between the sealing lips 17, 18 into a slot 29 in the head 9, and the fixing members 6 are screwed into threaded bores 30 of the roof guide 4. The holes 13, 28 have sufficient play on all sides relative to the fixing member 6 so that the sealing profile 5 can be optimally adjusted and set in each direction in relation to the roof guide 4 before the fixing members 6 are finally tightened up.

Any necessary later adjustment of the sealing profile 5 which is required is possible with extremely little expenditure, since in order to accomplish this it is only necessary to loosen the fixing members 6 in the necessary zone of the sealing profile 5 again, make the necessary adjustment to the sealing profile 5 and then tighten up the fixing members 6 again.

By this tightening of the fixing members, the heads 9 of the fixing members are brought into direct contact with the elastomer-free peripheral portion 10 of the carrier rail 7, while the elastomeric layer 12 has the effect of sealing the peripheral region 11 of the carrier rail 7 in relation to the roof guide 4. Consequently, one has an enduring tight seating of the sealing profile 5 against the roof guide 4.

A masking lip 31 of the elastomeric profile strip 8 which is directed back towards the interior of the convertible 1 serves to provide a visual masking of the roof guide 4 and has no sealing function.

FIG. 2 shows a part of the convertible 1 with closed folding soft top 2 and also with closed side window 21. Before the opening of the driver's door (FIG. 1) which carries the side window 21, the side window 21 is lowered automatically by about 20 mm in a manner known per se by a so-called short-stroke control mechanism, before the driver's door is opened. This means that the upper edge of the side window 21 can be pivoted outwards without contact with the sealing lip 17 and consequently without damaging the sealing profile 5. Preferably, the side window 21 remains in this lowered position until the driver's door has been closed again. At this instant, again by means of the short-stroke control mechanism, the side window 21 is raised again into the uppermost operative position shown in FIG. 2.

In all the Figures of the drawings, the same parts are indicated by the respective same reference numerals.

Figure 3:
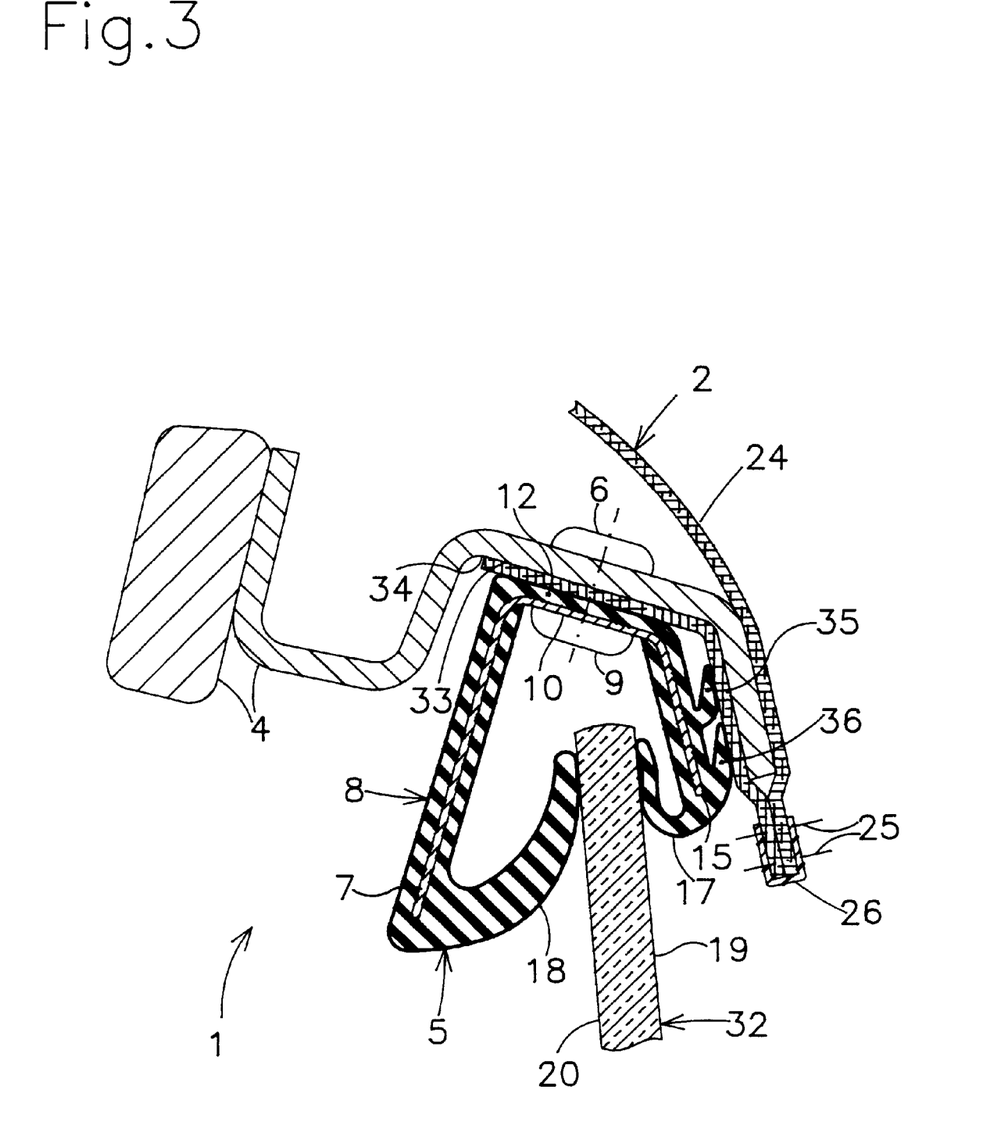
FIG. 3 is the sectional view taken along the line III—III in FIG. 1, on an enlarged scale.

FIG. 3 shows the sealing of a rear side window of the convertible 1.

A turned-up edge strip 33 of the roof cover 24 is here inserted between a mounting surface 34 of the roof guide 4 and the elastomeric layer 12. By means of the fixing members 6 which are here formed as rivets, the sealing profile 5 and the edge strip 33 are pressed tightly against the roof guide 4.

The leg 15 in this case carries on the outside two sealing lips 35 and 36 of the elastomeric profile strip 8. The sealing lips 35, 36 take care of the sealing in relation to an outer region of the edge strip 33. Instead of the rivets 6 one could, in FIG. 3, alternatively use other fixing members, for example screws, which permit easy release again for subsequent adjustment of the sealing profile 5.

Again in FIG. 3, the elastomeric profile strip 8 can consist of soft rubber with a hardness of 50 to 70 Shore A.

Figure 4:
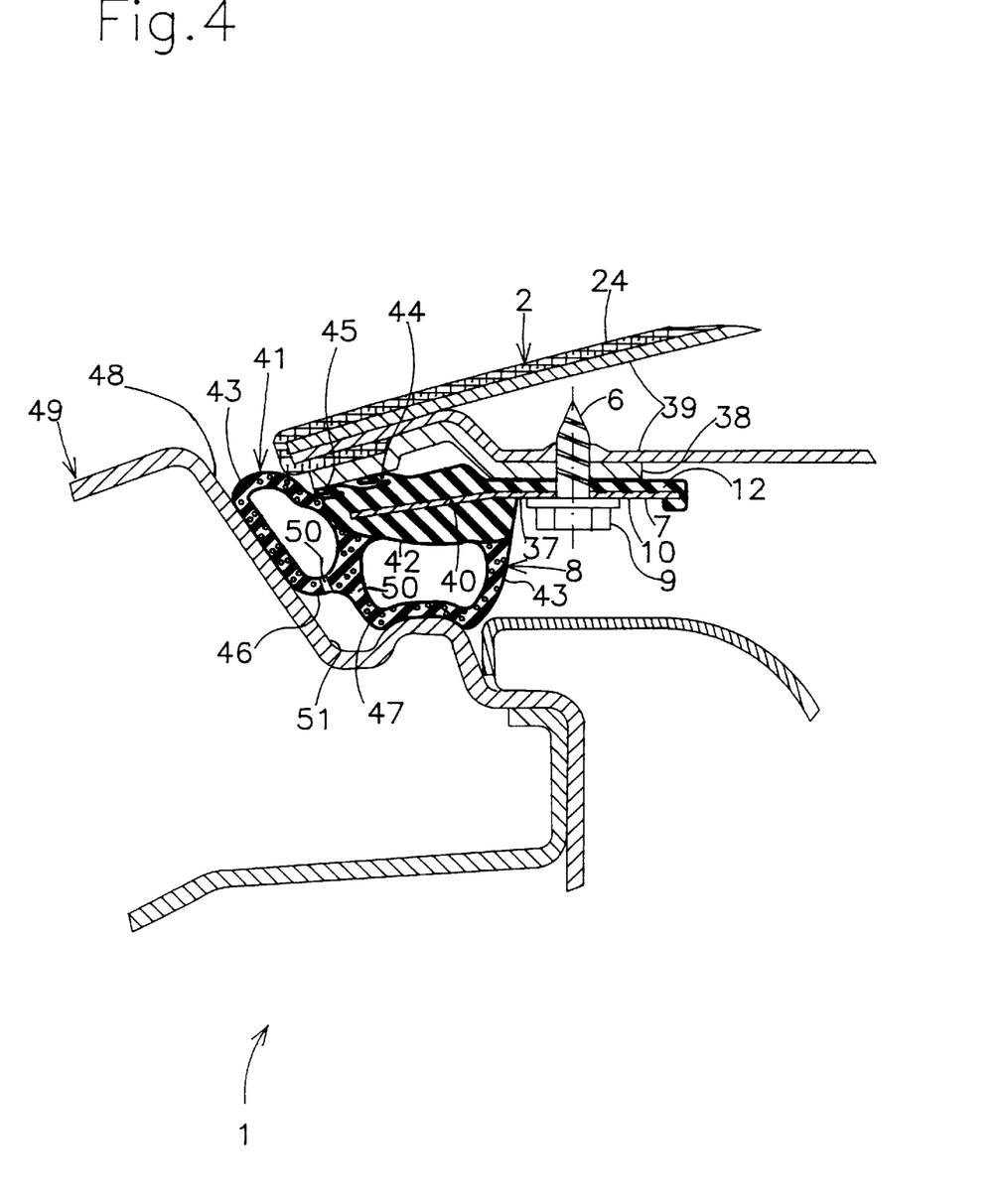
FIG. 4 is the sectional view taken along the line IV—IV in FIG. 1, on an enlarged scale.

FIG. 4 shows the situation at the forward roof frame of the convertible 1.

The fixing members 6 formed as carriage screws here cooperate with a first leg 37 of the carrier rail 7. The fixing members 6 are here screwed into a retaining profile 38 and into a strut 39 (mounting part) of the folding soft top 2. An outer part 41 of the elastomeric profile strip 8 is injected on to a second leg 40 of the carrier rail 7. This outer part comprises a first elastomeric profile strip 42 of soft rubber which is injected on to the second leg 40, and a second elastomeric profile strip 43 of foam rubber injected onto the first elastomeric profile strip 42. The first elastomeric profile strip 42 provides sealing lips 44 and 45 to effect permanent sealing in relation to the retaining profile 38 and consequently in relation to the folding soft top 2. The second elastomeric profile strip 43 defines tubes 46 and 47 on a side of the elastomeric profile strip 8 opposite the lips 44 and 45 and which, with the folding soft top 2 closed as shown in FIG. 4, cooperate sealingly with an opposing contact surface 48 on the windshield profile 49 of the convertible 1.

Ventilation holes 50 in the tubes 46, 47 open into a water channel 51 formed in the opposing contact surface 48 when the folding soft top 2 is closed. The water channel 51 takes away in the lateral direction any leakage water which possibly has penetrated through between the tube 46 and the opposing contact surface 48. The tube 47 serves less for sealing out moisture than for the insulation of the interior of the convertible 1 against noise.

Figure 5:
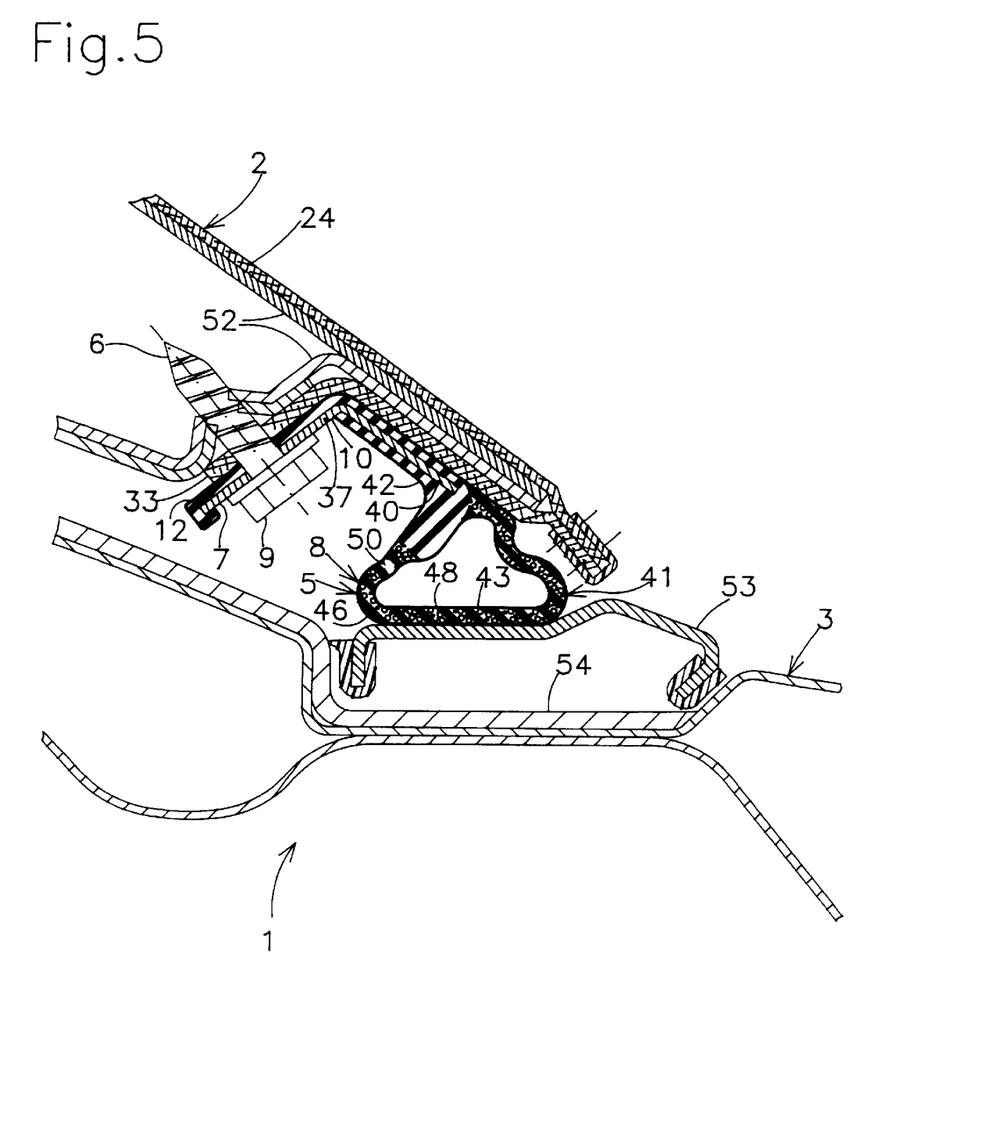
FIG. 5 is the sectional view taken along the line V—V in FIG. 1, on an enlarged scale.

FIG. 5 shows a detail of the rear roof frame of the convertible 1. Here, the sealing profile 5 and the turned-up edge strip 33 of the roof cover 24 are fixedly screwed to a clamping hoop 52 of the folding soft top 2 by means of fixing members 6 formed as carriage screws.

The outer part 41 again comprises the first elastomeric profile strip 42 of soft rubber and a second elastomeric profile strip 43 of foam rubber formed as tube 46. With the folding soft top 2 closed, the tube 46 effects a seal in relation to the opposing contact surface 48, as is shown in FIG. 5. The opposing contact surface 48 is a component of a rib 53 which is set on to a cover 54 of the soft top housing 3, and preferably consists of anodized aluminum.

Figure 6:
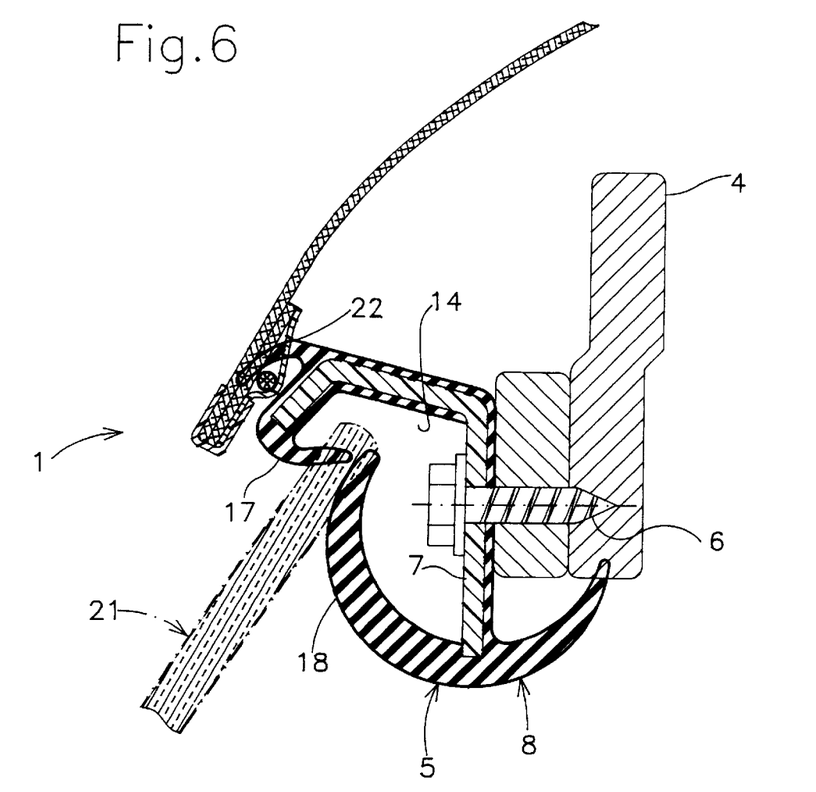
FIG. 6 is a sectional view, corresponding to that of FIG. 2, through another embodiment of the invention.

In FIG. 6 the sealing lips 17, 18 are shown in their rest position, in which they are in contact with one another and close the concave side 14 of the sealing profile 5. The side window 21 is additionally indicated by chain-dotted lines in its closed, uppermost position.

The embodiment shown in FIG. 6 differs from that shown in FIG. 2 in that the carrier rail 7 in FIG. 6 is extruded from a thermoplastic plastics material before the elastomeric profile strip 8 together with the carrier rail 7 are coextruded. Moreover, a carriage screw serves as the fixing member 6. Also, in FIG. 6, the further sealing lip 22 is shown in its unstressed position, while the operating position corresponds to that shown in FIG. 2.

The embodiment according to FIG. 7 differs from that of FIG. 3 in that the carrier rail 7 has here been injection molded from a plastics material and subsequently a first elastomeric profile strip 55 and a second elastomeric profile strip 56 have been injected on to the free ends of the carrier rail 7.

Here again, all regions of the elastomeric profile strips 55, 56 are shown in their unstressed positions.

Figure 8:
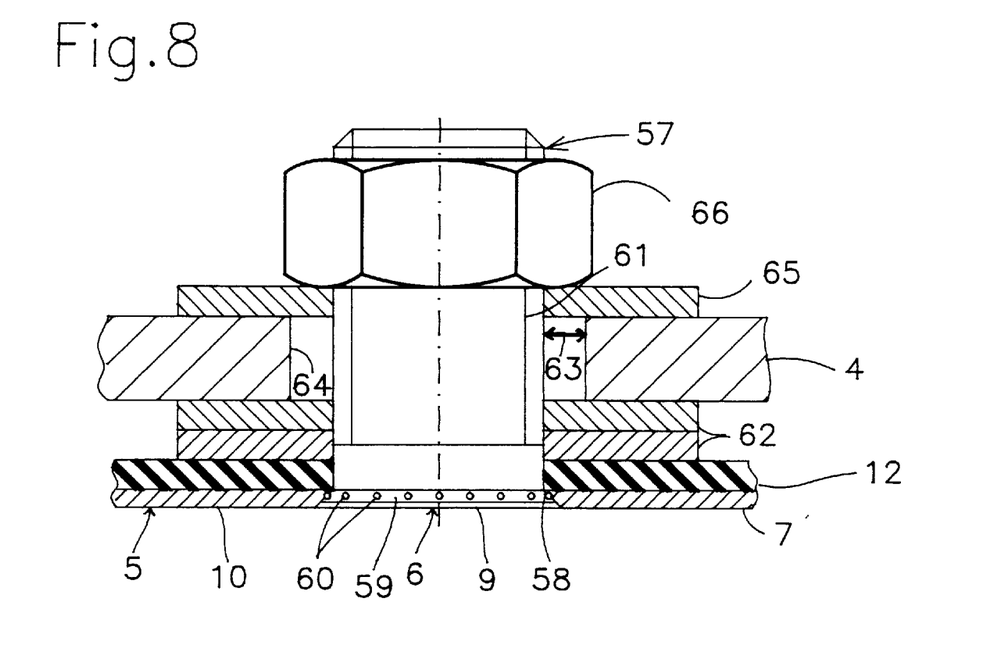
FIG. 8 is a longitudinal section through a special fixing member.

As shown in FIG. 8, the fixing member 6 comprises a threaded bolt 57 whose head 9 is frusto-conical, increasing in size towards the free end. The head 9 is pressed into a complementary shaped hole 58 in the carrier rail 7. A sleeve 59 of the frusto-conical head has profilings 60 which grip into an opposing contact surface of the hole 58 in a shape-locking manner as a result of the pressing in of the head. In this way, the head 9 sits in the hole 58 without danger of tilting and is moreover secured particularly well against rotation relative to the carrier rail 7.

A stem 61 of the threaded bolt 57 extends, starting from the head 9, through the elastomeric layer 12, then through compensating plates 62, then, with radial play 63, through a hole 64 in the mounting member which is formed as roof guide 4, and finally through a plate 65. On the free end of the threaded bolt 57 is screwed a nut 66 which secures the sealing profile 5 to the roof guide 4. An adjustment of the sealing profile 5 relative to the roof guide 4 can be effected in two mutually perpendicular directions. The adjustment in the direction of the longitudinal axis of the threaded bolt 57 is effected in that, starting from the zero setting shown in FIG. 8, compensating plates 62 are removed or introduced. The adjustment in the radial direction is effected in that the nut 66 is loosened and the sealing profile 5 together with the fixing member 6 is displaced transversely to the longitudinal axis of the threaded bolt 57 utilizing the available play 63, until the correct position has been found. In this position, the nut 66 is tightened again and consequently the sealing profile 5 is fixed. Even with the highest permissible tensile forces which are exerted by the tightening of the nut 66 on the threaded bolt 57, the rigid connection between the head 9 and the hole 58 in the carrier rail 7 is maintained.

Figure 9:
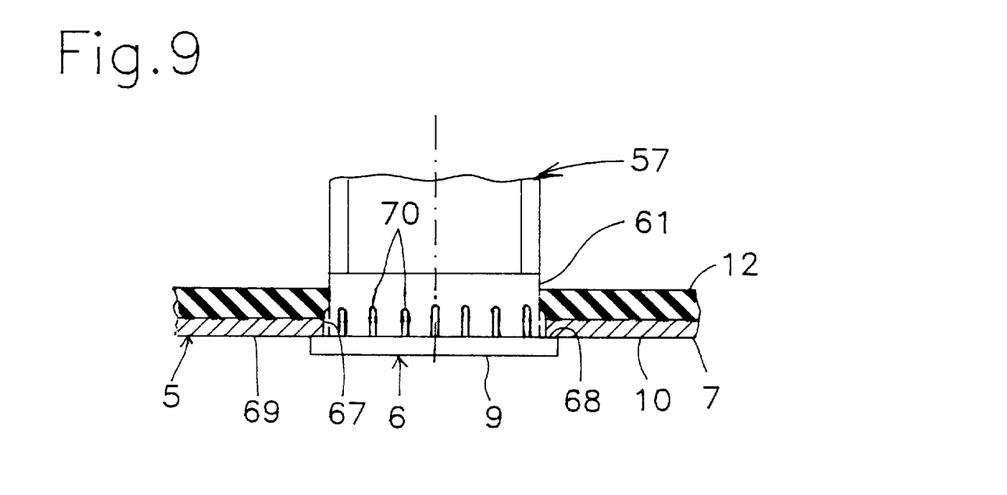
FIGS. 9 to 14 are respective longitudinal sectional views through a portion of other fixing members.

As shown in FIG. 9, the stem 61 of the threaded bolt 57 extends through a substantially cylindrical hole 67 in the carrier rail 7. The head 9 of the threaded bolt 57 is in contact with an annular surface 68 which encircles the hole 67 and which is on an inner surface 69 of the carrier rail 7. The stem 61 includes, immediately adjacent to the head 9, profilings 70 which grip in a shape-locking manner into a wall of the hole 67.

Figure 10:
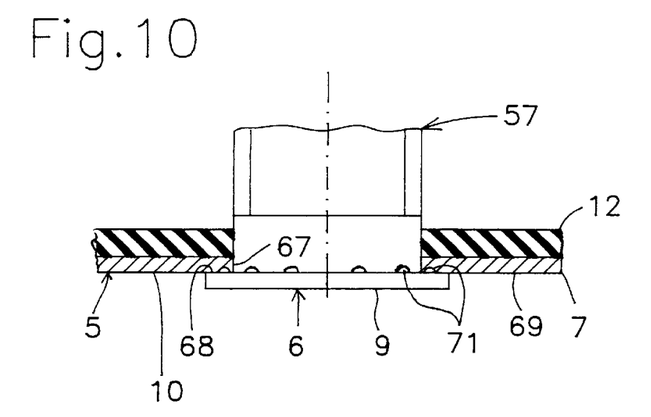

As shown in FIG. 10, the annular surface is provided with profilings 71 distributed around its circumference and which engage in the inner surface 69 of the carrier rail 7 in a shape-locking manner.

The shape-locking engagement of the profilings 70, 71 as shown in FIGS. 9 and 10 can be brought about by the fact that upon insertion of the threaded bolt 57 into the hole 67 a correspondingly high axial pressure force is exerted on the head 9.

Figure 11:
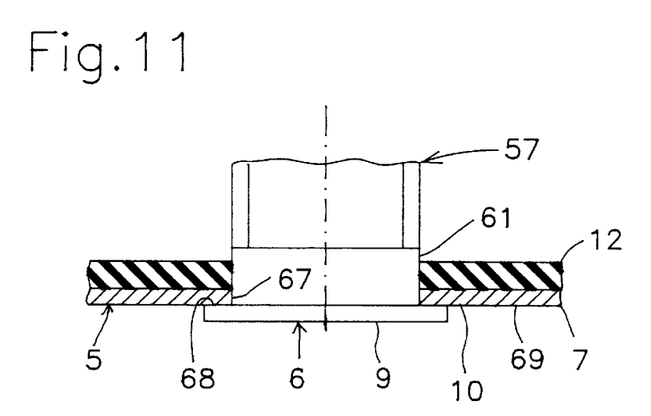

As shown in FIG. 11, the stem 61 of the threaded bolt 57 is seated as a press fit in the hole 67 in the carrier rail 7, so that a rotation of the threaded bolt 57 relative to the carrier rail 7 is excluded under all operating conditions. In order to achieve precise axial positioning of the threaded bolt 57, this again has its annular surface 68 in contact with the inner surface 69 of the carrier rail 7.

Figure 12:
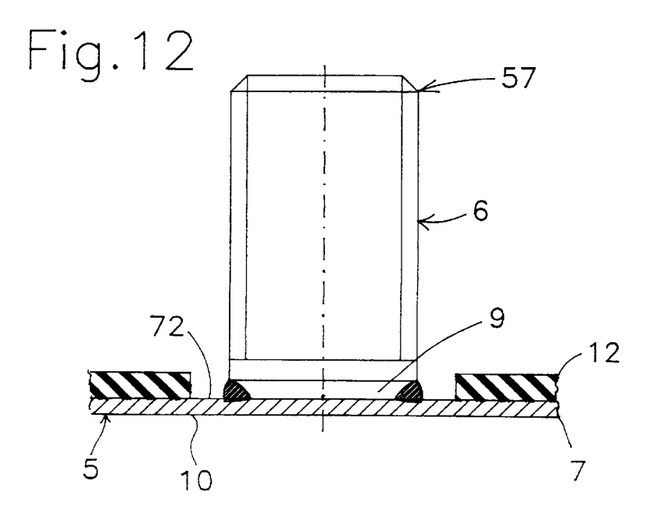

In the embodiment shown in FIG. 12, the carrier rail 7, as in the embodiments shown by way of example in FIGS. 8 to 11, consists of sheet metal, for example VA metal sheet of a thickness of 0.6 mm. However, in FIG. 12, the carrier rail 7 has no hole to receive the threaded bolt 57. Instead, the threaded bolt 57 has its frusto-conical, tapered head 9 welded directly to the carrier rail 7. Preferably, one uses a butt weld here. Before the welding operation, the elastomeric layer 12 which may be provided is removed from the region of the welding zone. Alternatively, in the coextrusion of the sealing profile 5, an outer peripheral portion 72 of the carrier rail 7 which lies opposite the peripheral portion 10 can be left free from the elastomeric layer 12.

Figure 13:
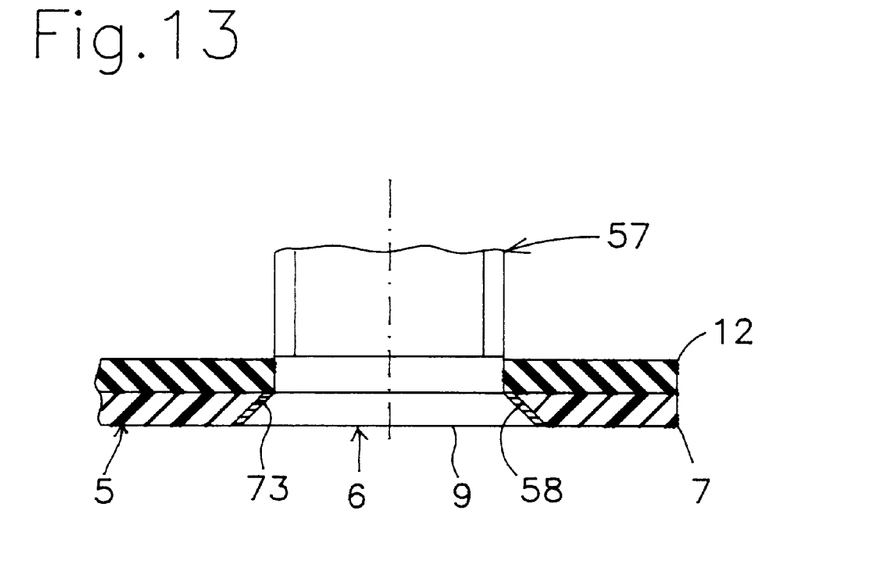
Figure 14:
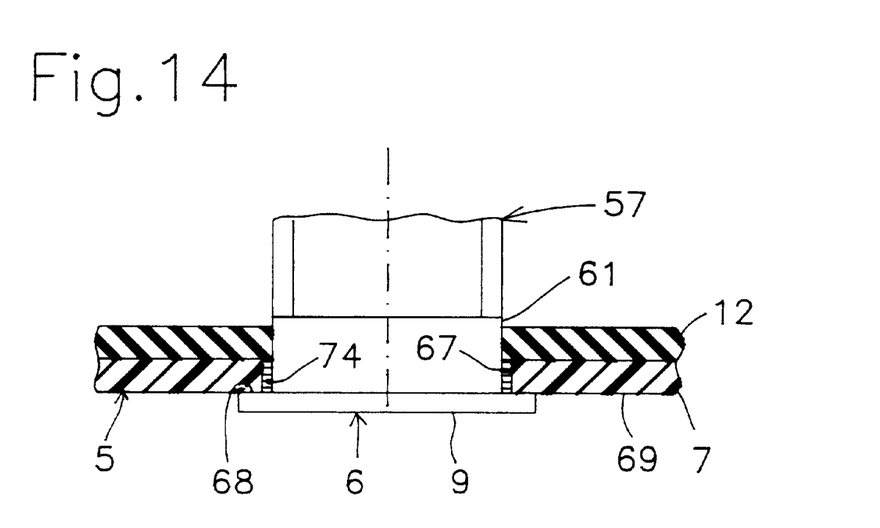

In the embodiments shown in FIGS. 13 and 14, the threaded bolts 57 are of plastics material, whereas the threaded bolts 57 shown in FIGS. 8 to 12 are preferably of metal.

Figure 7:
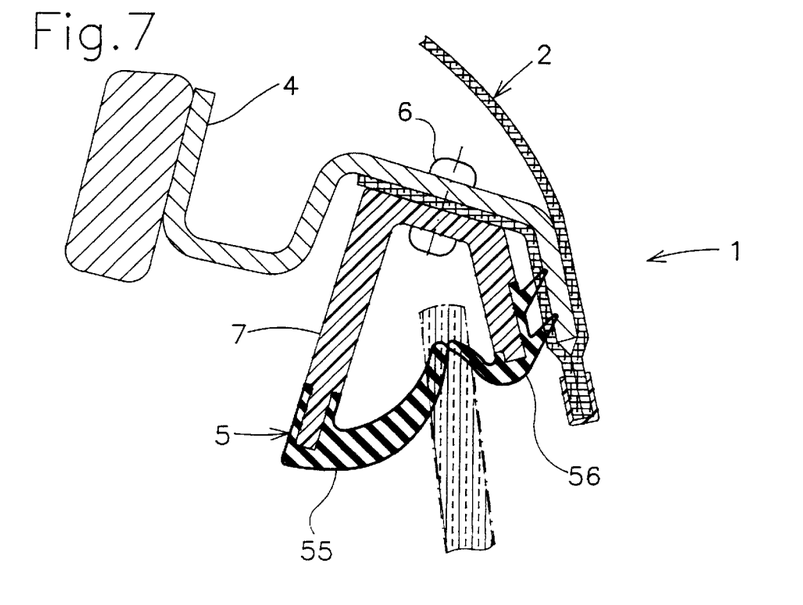
FIG. 7 is a sectional view, corresponding to that of FIG. 3, through yet another embodiment of the invention.

In FIGS. 13 and 14 the carrier rail 7 is made of plastics material, corresponding to the rail of FIGS. 6 and 7.

In FIG. 13, the head 9 of the threaded bolt 57, corresponding to FIG. 8, is enlarged in frusto-conical shape towards the free end. The head 9 is fixed by means of an adhesive layer 73 in the hole 58 in the carrier rail 7. This adhesive holds fast for all loads occurring in use.

In FIG. 14, the stem 61 of the threaded bolt 57 is glued by means of an adhesive layer 74 into the cylindrical hole 67. If needed, additional adhesive can be provided between the annular surface 68 of the head 9 and the inner surface 69 of the carrier rail 7.

What is claimed is:

1. A method for the manufacture of a sealing profile for a folding soft top of a convertible, the sealing profile including an inherently stable carrier rail and at least one elastomeric profile strip, the method comprising the following:

(a) injection molding the carrier rail from plastics material in a first molding tool wherein said rail is formed into a substantially final three-dimensional shape; and (b) injecting onto and vulcanizing at least one elastomeric profile strip to said carrier rail in a second molding tool.

2. A method for the manufacture of a sealing profile for a folding soft top of a convertibles comprising the following:

providing an inherently stable carrier rail and connecting at least one elastomeric profile strip to the carrier rail, forming said sealing profile to be three-dimensional and securable by threaded bolts to a mounting part of the folding soft top, and fixing at least two said threaded bolts to the carrier rail of the sealing profile to be held thereby, spaced from one another, so that during the fitting of the sealing profile each threaded bolt is adapted to be pushed through a hole of the associated mounting part and to be fixed axially relative to the mounting part.

3. A three dimensional sealing profile fastenable by means of fixing members to mounting parts of a folding soft top of a convertible for providing a seal between the folding soft top and an opposing contact surface of the convertible, said sealing profile comprising:

an inherently stable carrier rail having a first leg and a second leg, said first leg cooperating with the fixing members to fasten said sealing profile to said mounting parts, and at least one elastomeric profile strip connected to the carrier rail, said elastomeric strip being injection-molded onto at least a part of a periphery of said carrier rail and having an outer part injected onto the second leg, said outer part having a one side capable of being fixed relative to the folding soft top to cooperate sealingly therewith and an opposing side opposite said first side for contacting the contact surface of the convertible to cooperate sealingly therewith when the folding soft top is closed.

4. Sealing profile according to claim 3, wherein the outer part comprises a first elastomeric profile strip of soft rubber injected onto the second leg, and at least one second elastomeric profile strip of foam rubber injected onto the first elastomeric profile strip and positioned to be capable of cooperating sealingly with the opposing contact surface.

5. Sealing profile according to claim 3 wherein the carrier rail comprises sheet metal.

6. Sealing profile according to claim 3 wherein the carrier rail comprises an extruded thermoplastic plastics material.

7. Sealing profile according to claim 3 wherein the carrier rail comprises an injection molded plastics material.

8. A three dimensional sealing profile for the folding soft top of a convertible, the soft top having a mounting part, said profile comprising:

an inherently stable carrier rail;

at least one elastomeric profile strip connected to the carrier rail, said elastomer profile strip being injection molded onto at least a part of a periphery of the carrier rail; and fixing members for fastening said sealing profile to the mounting part of the folding soft top, said fixing members including at least two spaced threaded bolts fixed to said carrier rail so as to be held thereby, each said threaded bolt being arranged to be pushed through a corresponding hole in the mounting part and axially securable relative to the mounting part.

9. Sealing profile according to claim 8, wherein at least one of said bolts has a free end and a frusto-conical head broadening towards said free end, said carrier rail having a hole shaped complementary to said frusto-conical head in which said frusto-conical head is arranged.

10. Sealing profile according to claim 9, wherein said frusto-conical head includes a sleeve which has profilings that engage in a shape-locking manner an opposing contact surface of the complementarily shaped hole.

11. Sealing profile according to claim 8 wherein said carrier rail includes corresponding holes for each of said threaded bolts, each of said holes having an annular surface which surrounds the hole on an internal face of the carrier rail, and wherein each of said threaded bolts extends through one of said corresponding holes in the carrier rail and has a head in contact with the annular surface of said one corresponding hole.

12. Sealing profile according to claim 11 wherein each of said threaded bolts includes a stem having profilings immediately adjoining the head of said bolt, and each of said corresponding holes having a wall engaged in a shape-locking manner by said profilings.

13. Sealing profile according to claim 11 wherein each said head has profilings which engage the internal face of the carrier rail in a shape-locking manner.

14. Sealing profile according to claim 8 wherein said carrier rail includes holes, and wherein the threaded bolts are seated in the holes of the carrier rail by being press fitted therein.

15. Sealing profile according to claim 9 wherein said carrier rail has an internal face, and wherein the head of each said threaded bolt is adhesively secured to said internal face.

16. Sealing profile according to claim 8, wherein the threaded bolts are made of plastics material.

17. Sealing profile according to claim 8, wherein the threaded bolts are made of metal.

18. Sealing profile according to claim 17, wherein the threaded bolts are welded to the metallic carrier rail.

19. Sealing profile according to claim 9, wherein each of said threaded bolts has a stem adhesively secured to a wall of its said corresponding hole in the carrier rail.

* * * * *